(12) United States Patent
Zhang et al.

(10) Patent No.: US 11,234,246 B2
(45) Date of Patent: Jan. 25, 2022

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Zhi Zhang, Dongguan (CN); Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 37 days.

(21) Appl. No.: 16/623,729

(22) PCT Filed: Jun. 26, 2017

(86) PCT No.: PCT/CN2017/090102
§ 371 (c)(1),
(2) Date: Dec. 17, 2019

(87) PCT Pub. No.: WO2019/000195
PCT Pub. Date: Jan. 3, 2019

(65) Prior Publication Data
US 2021/0153214 A1 May 20, 2021

(51) Int. Cl.
*H04W 72/08* (2009.01)
*H04W 52/24* (2009.01)
(Continued)

(52) U.S. Cl.
CPC ........ *H04W 72/082* (2013.01); *H04B 1/0067* (2013.01); *H04B 1/50* (2013.01); *H04L 5/0057* (2013.01); *H04W 52/243* (2013.01)

(58) Field of Classification Search
CPC .............. H04W 72/082; H04W 52/243; H04B 1/0067; H04B 1/50; H04L 5/0057
See application file for complete search history.

(56) References Cited

U.S. PATENT DOCUMENTS

| | | | |
|---|---|---|---|
| 9,350,477 B1 | 5/2016 | Jung et al. | |
| 9,450,694 B1 | 9/2016 | Jung et al. | |
| (Continued) | | | |

FOREIGN PATENT DOCUMENTS

| | | |
|---|---|---|
| CN | 103052074 A | 4/2013 |
| CN | 104521271 A | 4/2015 |
| (Continued) | | |

OTHER PUBLICATIONS

Supplementary European Search Report in the European application No. 17915729.2, dated May 20, 2020.
(Continued)

*Primary Examiner* — Dominic E Rego
(74) *Attorney, Agent, or Firm* — Ladas & Parry, LLP

(57) ABSTRACT

Provided in an embodiment of the present invention are a wireless communication method and device capable of minimizing self-interference at a terminal device and improving communication performance. The method comprises: determining a magnitude of self-interference at a terminal device generated in a first uplink frequency band and a first downlink frequency band over which the terminal device performs communication with a network device; and transmitting a first message to the network device, the first message indicating the magnitude of the self-interference at the terminal device generated in the first UL frequency band and the first DL frequency band.

18 Claims, 3 Drawing Sheets

(51) Int. Cl.
    *H04B 1/00*        (2006.01)
    *H04B 1/50*        (2006.01)
    *H04L 5/00*        (2006.01)

(56) References Cited

U.S. PATENT DOCUMENTS

| | | |
|---|---|---|
| 9,584,294 B2 | 2/2017 | Ko et al. |
| 9,641,309 B2 | 5/2017 | Ko et al. |
| 2012/0075989 A1 | 3/2012 | Sabine |
| 2013/0044621 A1 | 2/2013 | Hyejung |
| 2013/0083672 A1* | 4/2013 | Johansson ........... H04W 72/082 370/252 |
| 2013/0194984 A1* | 8/2013 | Cheng ...................... H04L 5/14 370/294 |
| 2013/0242771 A1* | 9/2013 | Ohta ...................... H04W 16/26 370/252 |
| 2014/0016515 A1* | 1/2014 | Jana ......................... H04L 5/14 370/278 |
| 2014/0133411 A1* | 5/2014 | Park ...................... H04L 5/0053 370/329 |
| 2015/0063176 A1* | 3/2015 | Hong ................. H04B 7/15585 370/279 |
| 2015/0200764 A1* | 7/2015 | Lin ...................... H04L 5/0057 370/278 |
| 2015/0280887 A1 | 10/2015 | Ko et al. |
| 2015/0326269 A1 | 11/2015 | Ko et al. |
| 2015/0382375 A1* | 12/2015 | Bhushan ........... H04W 72/1289 370/252 |
| 2016/0150548 A1 | 5/2016 | Wu et al. |
| 2017/0012364 A1* | 1/2017 | Yang ...................... H01Q 21/24 |
| 2017/0104506 A1* | 4/2017 | Liu .......................... H04L 27/26 |
| 2017/0141886 A1* | 5/2017 | Chung .............. H04W 72/0406 |
| 2017/0245167 A1* | 8/2017 | Noh .......................... H04J 11/00 |
| 2018/0375566 A1* | 12/2018 | Hong ................. H04B 7/15585 |
| 2019/0037502 A1* | 1/2019 | Tang ................... H04W 52/243 |

FOREIGN PATENT DOCUMENTS

| | | |
|---|---|---|
| CN | 104838610 A | 8/2015 |
| EP | 2918027 A1 | 9/2015 |
| WO | 2010112066 A1 | 10/2010 |

OTHER PUBLICATIONS

English Translation of the Written Opinion of the International Search Authority in the international application No. PCT/CN2017/090102, dated Feb. 13, 2018.
International Search Report in the international application No. PCT/CN2017/090102, dated Feb. 13, 2018.
Written Opinion of the International Search Authority in the international application No. PCT/CN2017/090102, dated Feb. 13, 2018 and English translation provided by Google Translates.
Office Action of the Indian application No. 201917054224, dated Jan. 28, 2021.

* cited by examiner

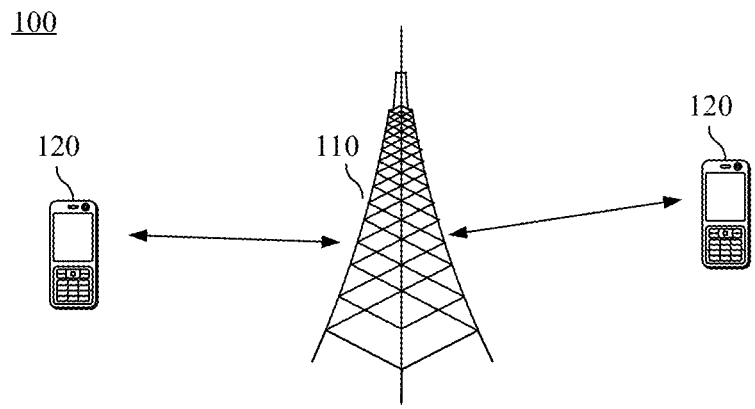

| Terminal device determines strength of self-interference with the terminal device generated by a first UL frequency band and a first DL frequency band during communication with a network device | 210 |

| The terminal device sends a first message to the network device, the first message being used to indicate the self-strength of interference at the terminal device generated by the first UL frequency band and the first DL frequency band | 220 |

| 310: A network device receives a first message sent by a terminal device, the first message being used to indicate strength of self-interference with the terminal device generated by a first UL frequency band and first DL frequency band during communication with the terminal device |

↓

| 320: The network device schedules the terminal device according to the strength of self-interference |

FIG. 3

Terminal device 400
- 410 Processing unit
- 420 Communication unit

FIG. 4

Network device 500
- 510 Communication unit
- 520 Processing unit

FIG. 5

WIRELESS COMMUNICATION METHOD AND DEVICE

CROSS-REFERENCE TO RELATED APPLICATION

The application is a national phase application of International Patent Application No. PCT/CN2017/090102, filed on Jun. 26, 2017, the content of which is hereby incorporated by reference in its entirety.

TECHNICAL FIELD

The disclosure relates to the field of communications, and more particularly to a wireless communication method and device.

BACKGROUND

If a receiver receives a signal at the same time when a transmitter of a terminal device transmits a signal and the signal transmitted and signal received by the terminal device are at the same frequency, the signal transmitted by the terminal device may interfere with the co-frequency signal received by the terminal device. Such a phenomenon may be called self-interference. Generation of the self-interference may result in reduction of communication performance.

In a future communication system, requirements of communication performance become increasingly high.

A problem urgent to be solved is how to minimize self-interference of a terminal device.

SUMMARY

Embodiments of the disclosure provide a wireless communication method and device, which may minimize self-interference of a terminal device and improve communication performance.

A first aspect provides a wireless communication method, which may include the following operations.

The terminal device determines strength of self-interference with the terminal device generated by a first Uplink (UL) frequency band and first Downlink (DL) frequency band during communication with a network device.

The terminal device sends a first message to the network device, the first message being used to indicate the strength of the self-interference with the terminal device generated by the first UL frequency band and the first DL frequency band.

In combination with the first aspect, in a possible implementation mode of the first aspect, the first message may include the following information: information of the first UL frequency band; information of the first DL frequency band; and information indicating the self-interference strength.

In combination with the first aspect or any abovementioned possible implementation mode, in another possible implementation mode of the first aspect, the first message may further used to indicate a type of self-interference with the terminal device generated by the first UL frequency band and the first DL frequency band.

In combination with the first aspect or any abovementioned possible implementation mode, in another possible implementation mode of the first aspect, the self-interference strength may be self-interference strength at the terminal device under a first transmit power, the first transmit power being transmit power under which the terminal device sends a signal to the network device by using the first UL frequency band.

In combination with the first aspect or any abovementioned possible implementation mode, in another possible implementation mode of the first aspect, the first message may further include information for indicating the first transmit power.

In combination with the first aspect or any abovementioned possible implementation mode, in another possible implementation mode of the first aspect, the operation that the terminal device determines the strength of the self-interference with the terminal device generated by the first UL frequency band and first DL frequency band during communication with the network device may include the following operation.

The strength of the self-interference with the terminal device generated by the first UL frequency band and the first DL frequency band is determined according to a preset list.

In combination with the first aspect or any abovementioned possible implementation mode, in another possible implementation mode of the first aspect, the preset list may include at least one combination of a UL frequency band and DL frequency band which generate self-interference, and self-interference strength corresponding to each of the at least one combination.

In combination with the first aspect or any abovementioned possible implementation mode, in another possible implementation mode of the first aspect, the first list may further include a type of the self-interference corresponding to each of the at least one combination.

In combination with the first aspect or any abovementioned possible implementation mode, in another possible implementation mode of the first aspect, the self-interference strength corresponding to each of the at least one combination may include: self-interference strength of each UL frequency band in the at least one combination under at least one transmit power.

In combination with the first aspect or any abovementioned possible implementation mode, in another possible implementation mode of the first aspect, the operation that the terminal device sends the first message to the network device may include the following operation.

In condition that the terminal device is within network coverage of the network device or after the terminal device receives an instruction from the network device, the first message is sent to the network device.

In combination with the first aspect or any abovementioned possible implementation mode, in another possible implementation mode of the first aspect, the operation that the terminal device determines the strength of the self-interference with the terminal device generated by the first UL frequency band and first DL frequency band during communication with the network device may include the following operation.

The strength of the self-interference with the terminal device generated by the first UL frequency band and the first DL frequency band is determined through measurement.

In combination with the first aspect or any abovementioned possible implementation mode, in another possible implementation mode of the first aspect, the method may further include the following operation.

The terminal device receives first instruction information sent by the network device. The first instruction information is used to instruct the terminal device to measure and/or report the strength of the self-interference with the terminal device generated by the first UL frequency band and the first DL frequency band.

In combination with the first aspect or any abovementioned possible implementation mode, in another possible implementation mode of the first aspect, the strength of self-interference may be self-interference strength of the terminal device at the first transmit power. The first transmitted power is transmit power under which the terminal device sends a signal to the network device by using the first UL frequency band.

The method may further include the following operation.

The terminal device receives second instruction information sent by the network device. The second instruction information is used to instruct the terminal device to measure and/or report the strength of the self-interference with the terminal device generated by the first UL frequency band and the first DL frequency band at the first transmit power.

In combination with the first aspect or any abovementioned possible implementation mode, in another possible implementation mode of the first aspect, the operation that the strength of the self-interference with the terminal device generated by the first UL frequency band and the first DL frequency band is determined through measurement may include the following operations.

In a first time period, a UL signal is sent to the network device by using a first UL frequency, and a signal is received on a first DL frequency.

Strength of the received signal is determined as the self-interference strength.

In combination with the first aspect or any abovementioned possible implementation mode, in another possible implementation mode of the first aspect, the method may further include the following operation.

The terminal device receives third instruction information sent by the network device. The third instruction information is used to instruct the terminal device to measure the strength of the self-interference with the terminal device generated by the first UL frequency band and the first DL frequency band in the first time period.

In combination with the first aspect or any abovementioned possible implementation mode, in another possible implementation mode of the first aspect, the first message may carry a first Channel Quality Indicator (CQI). The first CQI is used to indicate the strength of the self-interference with the terminal device generated by the first DL frequency band and the first UL frequency band.

In combination with the first aspect or any abovementioned possible implementation mode, in another possible implementation mode of the first aspect, before the operation that the terminal device sends the first message to the network device, the method may further include the following operations.

A second CQI is determined according to a reference signal sent to the terminal device by the network device using the first DL frequency.

The first CQI is determined according to the second CQI and the determined self-interference strength.

In combination with the first aspect or any abovementioned possible implementation mode, in another possible implementation mode of the first aspect, the first message may contain a first bit.

In condition that the first bit is a first value, a CQI in the first message is the first CQI.

In condition that the first bit is a second value, the CQI in the first message is the second CQI.

In combination with the first aspect or any abovementioned possible implementation mode, in another possible implementation mode of the first aspect, at least one of the first UL frequency band or the first DL frequency band may include multiple frequency bands.

A second aspect provides a wireless communication method, which may include the following operations.

A network device receives a first message sent by a terminal device, the first message being used to indicate strength of self-interference with the terminal device generated by a first UL frequency band and first DL frequency band during communication with the terminal device.

The network device schedules the terminal device according to the self-interference strength.

In combination with the second aspect, in a possible implementation mode of the second aspect, the first message may include the following information: information of the first UL frequency band; information of the first DL frequency band; and information indicating the self-interference strength.

In combination with the second aspect or any abovementioned possible implementation mode, in another possible implementation mode of the second aspect, the first message may further be used for indicating at least one of the following: a type of self-interference with the terminal device generated by the first UL frequency band and the first DL frequency band; or, first transmit power, the first transmit power being transmit power under which the terminal device sends a signal to the network device by using the first UL frequency band.

In combination with the second aspect or any abovementioned possible implementation mode, in another possible implementation mode of the second aspect, before the operation that the network device receives the first message sent by the terminal device, the method may further include the following operation.

The network device sends instruction information to the terminal device, the instruction information being used to instruct the terminal device to measure and/or report the strength of self-interference with the terminal device generated by the first UL frequency band and the first DL frequency band.

In combination with the second aspect or any abovementioned possible implementation mode, in another possible implementation mode of the second aspect, the instruction information may further be used to indicate at least one of the following: a transmit power under which the terminal device sends a signal to the network device by using a first UL frequency when measuring the self-interference strength; or, a time period for measuring the self-interference strength.

In combination with the second aspect or any abovementioned possible implementation mode, in another possible implementation mode of the second aspect, the method may further include the following operation.

In the time period for measuring the self-interference strength indicated by the instruction information, a DL signal is sent to the terminal device without using the first DL frequency band.

In combination with the second aspect or any abovementioned possible implementation mode, in another possible implementation mode of the second aspect, the first message may carry a first CQI. The first CQI is used to indicate the self-strength of interference with the terminal device generated by the first DL frequency band and the first UL frequency band.

In combination with the second aspect or any abovementioned possible implementation mode, in another possible implementation mode of the second aspect, the first message may contain a first bit.

In condition that the first bit is a first value, a CQI in the first message is the first CQI.

In condition that the first bit is a second value, the CQI in the first message is a second CQI. The second CQI is not used for indicating the self-interference strength.

In combination with the second aspect or any abovementioned possible implementation mode, in another possible implementation mode of the second aspect, at least one of the first UL frequency band or the first DL frequency band may include multiple frequency bands.

A third aspect provides a terminal device, which is configured to execute the method in the first aspect or any possible implementation mode of the first aspect. Specifically, the terminal device includes functional modules configured to execute the method in the first aspect or any possible implementation mode of the first aspect.

A fourth aspect provides a network device, which is configured to execute the method in the second aspect or any possible implementation mode of the second aspect. Specifically, the network device includes functional modules configured to execute the method in the second aspect or any possible implementation mode of the second aspect.

A fifth aspect provides a terminal device, which includes a processor, a memory and a transceiver. The processor, the memory and the transceiver communicate with each other via an internal connecting path to transmit control and/or data signals to enable the terminal device to execute the method in the first aspect or any possible implementation mode of the first aspect.

A sixth aspect provides a network device, which includes a processor, a memory and a transceiver. The processor, the memory and the transceiver communicate with one another through an internal connecting path to transmit control and/or data signals to enable the network device to execute the method in the second aspect or any possible implementation mode of the second aspect.

A seventh aspect provides a computer-readable medium, which is configured to store a computer program, the computer program including an instruction for executing the method in each aspect or any possible implementation mode.

An eighth aspect provides a computer program product including an instruction, which when running on a computer, causes the computer to execute the method in each aspect or any possible implementation mode.

In such a manner, in the embodiments of the disclosure, the terminal device determines the strength of self-interference with the terminal device generated by the first UL frequency band and first DL frequency band during communication with the network device and reports the information indicating the self-interference strength to the network device, and then the network device may schedule the terminal device according to the information indicating the self-interference strength, so that self-interference at a terminal side is minimized, and communication performance is thereby improved.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

FIG. 1 is a schematic diagram of a wireless communication system according to an embodiment of the disclosure.

FIG. 2 is a schematic flowchart of a wireless communication method according to an embodiment of the disclosure.

FIG. 3 is a schematic flowchart of a wireless communication method according to an embodiment of the disclosure.

FIG. 4 is a schematic block diagram of a terminal device according to an embodiment of the disclosure.

FIG. 5 is a schematic block diagram of a network device according to an embodiment of the disclosure.

DETAILED DESCRIPTION

Figure 6:
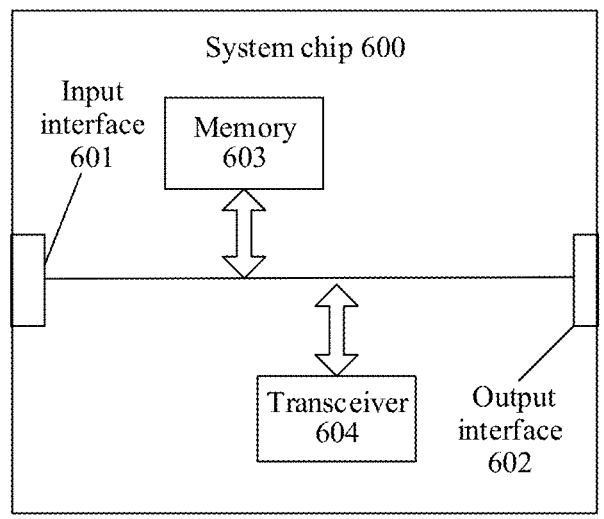
FIG. 6 is a schematic block diagram of a system chip according to an embodiment of the disclosure.

The technical solutions in the embodiments of the disclosure will be described below in combination with the drawings in the embodiments of the application. It is apparent that the described embodiments are not all embodiments but part of embodiments of the disclosure. All other embodiments obtained by those of ordinary skill in the art on the basis of the embodiments in the disclosure without creative work shall fall within the scope of protection of the application.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

FIG. 1 illustrates a wireless communication system 100 to which the embodiments of the disclosure are applied. The wireless communication system 100 may include a network device 110. The network device 110 may be a device that communicates with a terminal device. The network device 110 may provide communication coverage for a specific geographical region and may communicate with a terminal device (for example, User Equipment (UE)) within the coverage. In at least one embodiment, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be a mobile or stationary terminal. In at least one embodiment, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

In at least one embodiment, the terminal device 120 may perform Device to Device (D2D) communication.

In at least one embodiment, the 5G system or network may also be called a New Radio (NR) system or network.

A network device and two terminal devices are exemplarily illustrated in FIG. 1. In at least one embodiment, the wireless communication system 100 may include multiple network devices and other number of terminal devices may be included within coverage of each network device. There are no limits made thereto in the embodiments of the application.

In at least one embodiment, the wireless communication system 100 may further include another network entity such as a network controller and a mobility management entity, which is not limited in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In at least one embodiment, if a receiver receives a signal at the same time when a transmitter of a terminal device transmits a signal and the signal transmitted and signal received by the terminal device are at the same frequency, the signal transmitted by the terminal device may interfere with the co-frequency signal received by the terminal device. Such a phenomenon may be called self-interference.

In at least one embodiment, the self-interference may be divided into three types of the following: harmonic interference, harmonic mixing interference and Intermodulation (IM) interference. Each type of the self-interference may further be subdivided in smaller granularities. For example, IM interference may be divided into different types of interference depending upon different orders of IM signals. For example, harmonic interference may be divided into different types of interference depending upon different doubled frequencies of signals in harmonic interference.

Several types of self-interference will be described below in the condition that a terminal device simultaneously operates on a carrier F1 and a carrier F2 as an example. It is assumed that the carrier F1 is within a low frequency band and the carrier F2 is within a high frequency band.

In a possible implementation, frequencies of IM signals of a certain order of a UL carrier of F1 and a UL carrier of F2 are overlapped or partially overlapped with a frequency of a DL signal of a carrier F3. Then, the carriers F1 and F2 generate IM interference to the carrier F3. Here, the carrier F3 may be one of the carriers F1 and F2, or another carrier different from F1/F2 (in such case, the terminal device simultaneously operates on more than two carriers).

For example, if the terminal device is simultaneously configured with LTE carriers of a band 1 and a band 7 and an NR carrier (3,400-3,800 MHz), fifth-order IM interference generated due to simultaneous transmission in a UL of the band 7 and in an UL of NR may affect sensitivity of a DL receiver that operates in the band 1.

In a possible implementation, a doubled frequency of the UL carrier of F1 is overlapped or partially overlapped with a frequency of a DL signal of F2. Then, the carrier F1 generates harmonic interference to F2.

For example, an UL carrier in LTE band 3 is within 1,710-1,785 MHz and a second-order harmonic thereof has a range of 3,420-3,570 MHz. If a terminal simultaneously performs UL transmission of LTE on the band 3 and performs DL reception on the NR frequency band 3,400-3,800 MHz, the second-order harmonic may interfere with sensitivity of DL receiver in NR.

In a possible implementation, a doubled frequency of a DL carrier of F1 is overlapped or partially overlapped with a frequency (and an adjacent frequency thereof) of a UL signal of F2. Then, the carrier F2 generates harmonic mixing interference to F1.

For example, a DL carrier in LTE band 3 is within 1,805-1,880 MHz and a second-order harmonic thereof has a range of 3,610-3,760 MHz. If a terminal simultaneously performs DL reception of LTE on the band 3 and performs UL sending on the NR frequency band 3,400-3,800 MHz, the second-order harmonic mixing of NR may interfere with sensitivity of DL receiver in LTE.

In order to minimize self-interference, the embodiments of the disclosure provide the following method and device.

FIG. 2 is a schematic flowchart of a wireless communication method 200 according to an embodiment of the disclosure. In at least one embodiment, the method 200 may be applied, but not limited to, the system illustrated in FIG. 1. In at least one embodiment, the method 200 may be executed by a terminal device. The method 200 includes at least part of the following operations.

In 210, the terminal device determines strength of self-interference with the terminal device generated by a first UL frequency band and first DL frequency band during communication with a network device.

In an implementation mode, the terminal device may determine the strength of the self-interference with the terminal device generated by the first UL frequency band and the first DL frequency band according to a preset list.

In another implementation mode, the terminal device may determine the strength of self-interference at the terminal device generated by the first UL frequency band and the first DL frequency band in a measurement manner.

In at least one embodiment, in the embodiment of the disclosure, the above self-interference strength may be strength of a signal (not including a signal received from the outside) received in the first DL frequency band when a UL signal is sent by using the first UL frequency band.

In at least one embodiment, in the embodiment of the disclosure, the first UL frequency band includes multiple frequency bands; and/or, the first DL frequency band includes multiple frequency bands.

It is to be understood that in the embodiments of the disclosure, self-interference with or at the terminal device being generated by the first UL frequency band and the first DL frequency band means that: signals sent by the terminal device within all or part of a frequency range of the first UL frequency band interfere with signals simultaneously received within all or part of a frequency range of the first DL frequency band.

In 220, the terminal device sends a first message to the network device, The first message is used to indicate the strength of the self-interference with the terminal device generated by the first UL frequency band and the first DL frequency band.

In at least one embodiment, the first message includes the following information: information of the first UL frequency band; information of the first DL frequency band; and information indicating the self-interference strength.

In at least one embodiment, the information of the first UL frequency band may include a starting and an ending frequency of the frequency band, or include the starting frequency and a size of the frequency band, or include the ending frequency and the size of the frequency band.

In at least one embodiment, the information of the first DL frequency band may include the starting and ending frequency of the frequency band, or include the starting frequency and a size of the frequency band, or include the ending frequency and the size of the frequency band.

In at least one embodiment, the information indicating the self-interference strength may directly indicate the self-interference strength. For example, if the self-interference strength is the strength of the signal received in the first DL frequency band, the self-interference strength is directly reported to the network device.

In at least one embodiment, the information indicating the self-interference strength may indirectly indicate the self-interference strength. For example, the self-interference strength may be indicated by virtue of a CQI acquired based on a reference signal.

In at least one embodiment, the first message carries a first CQI. The first CQI is used to indicate the strength of the self-interference with the terminal device generated by the first DL frequency band and the first UL frequency band.

In at least one embodiment, the terminal device determines a second CQI according to a reference signal sent to the terminal device by the network device using a first DL frequency; and the terminal device determines the first CQI according to the second CQI and the determined self-interference strength. The second CQI is not used to indicate the self-interference strength, and is related to a Modulation and Coding Scheme (MCS) for a signal in at least one embodiment.

Specifically, since self-interference may reduce reception performance in DL of the terminal device, reporting of self-interference calculation by the terminal device to the network device may also be reflected by calculation of the CQI by the terminal device. The terminal may calculate a ratio of signal strength of a frequency band in which the interference is generated to (noise intensity+self-interference strength), and converts the ratio into the CQI for reporting to a network.

In at least one embodiment, the terminal device may report the CQI indicating the self-interference strength to the network device through physical-layer signaling.

In at least one embodiment, if the network device requires a CQI report of the terminal device in some frequency bands to include self-interference of the terminal device, a certain field of an indication message is adopted. For example, if a value of the field is 1, the reported CQI includes the self-interference strength; and if the value of the field is 0, the reported CQI does not include the self-interference strength.

In at least one embodiment, the first message reported to the network device by the terminal device may contain a first bit. When the first bit is a first value (for example, 1), a CQI in the first message is the first CQI. When the first bit is a second value (for example, 0), the CQI in the first message is the second CQI.

It is to be understood that information indicating both the second CQI and the self-interference strength may also not be called a CQI, and may also have another name. Any name that is in essential the same as the second CQI of the application shall fall within the scope of protection of the disclosure.

In at least one embodiment, in the embodiment of the disclosure, the first message is further used to indicate a type of self-interference at the terminal device in the first UL frequency band and the first DL frequency band.

In an implementation mode, the first UL frequency band may include multiple UL frequency bands, and the first DL frequency band includes a DL frequency band. In such case, the type of generated interference may be IM interference. The type of the interference may further be subdivided according to an order of an IM signal that generates the interference.

In an implementation mode, the first UL frequency band may include a UL frequency band and the first DL frequency includes a DL frequency band. In such case, the type of interference generated may be harmonic interference or harmonic mixing interference. The type of interference may further be subdivided according to a doubled frequency of the UL frequency band that interferes with the DL frequency band, or may further be subdivided according to a doubled frequency of the DL frequency band that is interfered by the UL frequency.

In at least one embodiment, in the embodiment of the disclosure, the strength of the self-interference with the terminal device generated by the first UL frequency band and the first DL frequency band may also be associated with a transmit power. Then, the self-interference strength reported to the network by the terminal device may be self-interference strength of the terminal device at a first transmit power. The first transmit power is a transmit power under which the terminal device sends a signal to the network device by using the first UL frequency band.

In this implementation mode, the first message further includes information for indicating the first transmit power.

In at least one embodiment, when the first UL frequency band includes multiple frequency bands, transmit power at which a UL signal is sent in each frequency band may be included. The transmit power in the multiple frequency bands may be the same and may also be different.

Therefore, in the implementation mode, the network device schedules the terminal device in combination with the strength of the self-interference with the terminal device generated by the first UL frequency band and the first DL frequency band at a specific transmit power of the terminal device. For example, if the interference strength is relatively high at the transmit power, the transmit power of the terminal device may be reduced, or the terminal device is prevented from being scheduled for simultaneous transmission and reception of the signal in the first UL frequency band and the first DL frequency band. Or, if the interference strength is relatively low at the transmit power, it may be attempted to increase the transmit power of the terminal device.

In at least one embodiment, in the embodiment of the disclosure, the terminal device may determine the strength of the self-interference with the terminal device generated by the first UL frequency band and the first DL frequency band in multiple manners. For ease of understanding, two implementation modes will be introduced below.

In an implementation mode, the terminal device determines the strength of the self-interference with the terminal device generated by the first UL frequency band and the first DL frequency band according to a preset list.

In at least one embodiment, since self-interference is generated within the terminal device and frequency bands supported by the terminal device is already known when the terminal device is designed, if mutual interference exists for these frequency bands, strength of the mutual interference may also be obtained through measurement during a design process of the terminal device and has been preset in the terminal device when the terminal is manufactured.

In at least one embodiment, after the terminal device is manufactured, the self-interference strength corresponding to each frequency band combination may also be sequentially measured and pre-stored in the terminal device.

In at least one embodiment, the preset list includes at least one combination of a UL frequency band and DL frequency band which generate self-interference, and self-interference strength corresponding to each of the at least one combination.

In at least one embodiment, a combination of the first UL frequency band and the first DL frequency band may be any one combination of the at least one combination.

Information of the frequency bands in the at least one combination may include a starting and ending frequency position of the UL frequency band and a starting and ending frequency position of the DL frequency band.

In at least one embodiment, each of the at least one combination may include multiple UL frequency bands and/or multiple DL frequency bands. In such case, the information of the frequency bands in the at least one combination may include a starting and ending frequencies of each frequency band.

In at least one embodiment, the frequency bands in the at least one combination may be frequency bands supported by the terminal device, and a granularity for frequency band division may be determined according to an actual condition. The combination of the UL frequency band and DL frequency band which generate self-interference may be represented as follows: all or part of a frequency range of the UL frequency band generates self-interference with all or part of a frequency range of the DL frequency band.

In at least one embodiment, the preset list further includes a type of self-interference corresponding to each of the at least one combination.

In at least one embodiment, self-interference strength under multiple pieces of transmit power are adopted for signal sending on each UL frequency band in the at least one combination respectively.

In at least one embodiment, when the at least one combination includes multiple UL frequency bands, transmit power of each UL frequency band may be different and may also be the same. The preset list may indicate the transmit power in each UL frequency band.

For example, for IM interference, the transmit power for signal sending on each UL carrier may be preset in the preset list.

In at least one embodiment, when the terminal device is within network coverage of the network device or after the terminal receives an instruction from the network device, the terminal device sends the first message to the network device.

Specifically, when the terminal device is within the coverage of the network device, information in the preset list may be automatically reported to the network device. Or, after the instruction of the network device is received by the terminal device, the information in the preset list is reported to the network device according to the instruction of the network device (all or part of the information in the preset list may be reported). The network device may instruct the terminal device to report the self-interference strength in the specific frequency band combination or report the self-interference strength in the specific frequency band combination and at a specific transmit power.

In another implementation mode, the terminal device performs measurement to determine the strength of self-interference with the terminal device generated by the first UL frequency band and the first DL frequency band.

In at least one embodiment, the terminal device may receive first instruction information sent by the network device. The first instruction information is used for instructing the terminal device to measure and/or report the strength of self-interference at the terminal device generated by the first UL frequency band and the first DL frequency band.

It is to be understood that the operation, as mentioned in the embodiment of the disclosure, that the network device instructs the terminal device to report the self-interference strength may refer that the information directly indicating the self-interference strength or the information indirectly indicating the self-interference strength is reported to the network device.

In at least one embodiment, the above strength of self-interference is the self-interference strength at the terminal device under a first transmit power, and the first transmit power is the transmit power under which the terminal device sends the signal to the network device by using the first UL frequency band. The terminal device receives second instruction information sent by the network device, and the second instruction information is used for instructing the terminal device to measure and/or report the strength of self-interference with the terminal device generated by the first UL frequency band and the first DL frequency band at the first transmit power.

In at least one embodiment, in a first time period, a UL signal is sent to the network device by the terminal device using a first UL frequency, and a signal is received on a first DL frequency; and strength of the received signal is determined as the self-interference strength.

In at least one embodiment, third instruction information sent by the network device is received by the terminal device. The third instruction information is used for instructing the terminal device to measure the strength of the self-interference with the terminal device generated by the first UL frequency band and the first DL frequency band in the first time period.

Specifically, the terminal device may be instructed by the network device to measure the self-interference strength. Specifically, the terminal device may report that the terminal device has a capability of measuring and report the self-interference strength to the network device.

The network device, after acquiring the capability of the terminal device, may instruct the terminal device to measure the self-interference strength of a specific frequency band combination. The instruction of the network device may at least instruct the frequency band combination, and optionally instruct the transmit power for signal transmission on a UL frequency band in the frequency band combination. If multiple UL frequency bands are included in the frequency band combination (for example, generating IM interference), the transmit power in each UL frequency band is required to be indicated by the network device.

The instruction of the network device may further include instruction of starting and ending time when the terminal device measures the self-interference strength. Since the terminal device may not normally receive a DL signal of the network device when implementing measurement specified by the network device, the network device may allocate a certain period (for example, some idle subframes or idle symbols) for the terminal device. The terminal device completes measurement in the period allocated by the network device, and in the measurement process of the terminal device, the terminal device would not receive any DL signal from the network at least on the measured frequency band. After the terminal device completes the measurement, the terminal device may report a measurement result to the network device, for example, reporting the measurement result to the network device through high-layer signaling.

Therefore, in this implementation mode, the terminal device may measure the self-interference strength according to the instruction of the network device and report information indicating the self-interference strength, which allows the terminal device not to preset excessive self-interference information, and accuracy of the preset self-interference information may be ensured.

For example, it is unlikely to ensure that terminal devices of even the same type have identical parameters because of the radio frequency devices used therein, and it is possible that self-interference information measured during design still differs from the generated self-interference at a terminal device in actual use. The method of measurement after the terminal device is manufactured may only be suitable for a small number of terminal devices, and is unrealistic for production of a large number of terminal devices.

For another example, when there are relatively more frequency band combinations which generate self-interference, the amount of all possible self-interference information may be considerable. For example, for IM interference, bandwidths of two UL signals that generate IM interference may affect bandwidths affected by the IM interference respectively, and power of the two UL signals that generate the IM interference may also affect the strength of interference. Moreover, such results will also vary depending on the type of the IM (orders). Considering all the abovementioned frequency band combinations in advance and various frequency band combinations which generate interference, the final amount of the self-interference information is quite huge.

It is to be understood that, in the embodiment of the disclosure, the first UL frequency band and the first DL frequency band may be scheduled by different network devices respectively, and the terminal device may report the self-interference strength to any one or all of the network devices. For example, in condition that the first UL frequency band is a frequency band during communication with a first network device, and a second UL frequency band is a frequency band during communication between the terminal device and a second network device, the terminal device may report the self-interference strength and other information to the first network device and/or the second network device.

FIG. 3 is a schematic flowchart of a wireless communication method 300 according to an embodiment of the application. In at least one embodiment, the method 300 may be applied to the wireless communication system illustrated in FIG. 1. In at least one embodiment, the method may be executed by a network device. The method 300 includes at least part of the following operations.

In 310, the network device receives a first message sent by a terminal device. The first message is used for indicating strength of self-interference with the terminal device generated by a first UL frequency band and first DL frequency band during communication between the terminal device and the network device.

In at least one embodiment, the first UL frequency band includes multiple frequency bands; and/or, the first DL frequency band includes multiple frequency bands.

In at least one embodiment, the first message includes the following information: information of the first UL frequency band; information of the first DL frequency band; and information indicating the self-interference strength.

In at least one embodiment, the first message is further configured to indicate: a type of self-interference of the terminal device in the first UL frequency band and the first DL frequency band; and/or, first transmit power. The first transmit power is a transmit power under which the terminal device sends a signal to the network device by using the first UL frequency band.

In at least one embodiment, in the embodiment of the disclosure, the network device, before receiving the first message sent by the terminal device, sends instruction information to the terminal device. The instruction information is used for instructing the terminal device to measure and/or report the strength of self-interference with the terminal device generated by the first UL frequency band and the first DL frequency band.

The instruction information is further configured to indicate at least one of the following: transmit power under which the terminal device sends a signal to the network device by using a first UL frequency when the terminal device measures the self-interference strength; and/or, a time period for measuring the self-interference strength.

In at least one embodiment, in the time period for measuring the self-interference strength indicated by the instruction information, the network device does not send DL signal to the terminal device by using the first DL frequency band.

In at least one embodiment, the first message carries a first CQI, and the first CQI is used for indicating the strength of self-interference with the terminal device generated by the first DL frequency band and the first UL frequency band.

In at least one embodiment, the first message contains a first bit. When the first bit is a first value, it is indicated that a CQI in the first message is the first CQI. When the first bit is a second value, it is indicated that the CQI in the first message is a second CQI. The second CQI is not used for indicating the strength of self-interference with the terminal device generated by the first DL frequency band and the first UL frequency band.

In 320, the network device schedules the terminal device according to the self-interference strength.

Specifically, the network device, after receiving the first message sent by the terminal device, may acquire the specific frequency band where the self-interference of the terminal device may be generated as well as the level of the interference strength. The network device may perform corresponding scheduling accordingly, for example, preventing the terminal device from being scheduled for signal transmission and reception in a receiving frequency band with strong self-interference, or not scheduling the terminal device for simultaneous signal transmission and reception in a frequency band combination where self-interference may be generated.

It is to be understood that each implementation mode in the method 300 may refer to descriptions about the method 200 and will not be elaborated herein for simplicity.

In such a manner, in the embodiment of the disclosure, the terminal device determines the strength of self-interference with the terminal device generated by the first UL frequency band and first DL frequency band during communication with the network device, and reports the information indicating the self-interference strength to the network device; and then the network device may schedule the terminal device according to the information indicating the self-interference strength, so that self-interference at a terminal side is minimized, and communication performance is thereby improved.

FIG. 4 is a schematic block diagram of a terminal device 400 according to an embodiment of the disclosure. As illustrated in FIG. 4, the terminal device 400 includes a processing unit 410 and a communication unit 420.

The processing unit 410 is configured to determine strength of self-interference with the terminal device generated by a first UL frequency band and first DL frequency band during communication between the terminal device and a network device.

The communication unit 420 is configured to send a first message to the network device. The first message is used for indicating the strength of self-interference with the terminal device generated by the first UL frequency band and the first DL frequency band.

In at least one embodiment, the first message includes the following information: information of the first UL frequency band; information of the first DL frequency band; and information indicating the self-interference strength.

In at least one embodiment, the first message is further configured to indicate a type of self-interference of the terminal device in the first UL frequency band and the first DL frequency band.

In at least one embodiment, the self-interference strength is self-interference strength at the terminal device under a first transmit power. The first transmit power is a transmit power under which the terminal device sends a signal to the network device by use of a first UL frequency band.

In at least one embodiment, the first message further includes information for indicating the first transmit power.

In at least one embodiment, the processing unit 410 is further configured to determine the strength of the self-interference with the terminal device generated by the first UL frequency band and the first DL frequency band according to a preset list.

In at least one embodiment, the preset list includes at least one combination of a UL frequency band and DL frequency band which generate the self-interference, and self-interference strength corresponding to each of the at least one combination.

In at least one embodiment, the preset list further includes a type of self-interference corresponding to each of the at least one combination.

In at least one embodiment, the self-interference strength corresponding to each of the at least one combination includes: self-interference strength of each UL frequency band in each of the at least one combination under at least one transmit power.

In at least one embodiment, the communication unit 420 is further configured to: when the terminal device is within network coverage of the network device or after the terminal device receives an instruction of the network device, send the first message to the network device.

In at least one embodiment, the communication unit 420 is further configured to: determine the strength of the self-interference with the terminal device generated by the first UL frequency band and the first DL frequency band through measurement.

In at least one embodiment, the communication unit 420 is further configured to: receive first instruction information sent by the network device. The first instruction information is used for instructing the terminal device to measure and/or report the strength of the self-interference with the terminal device generated by the first UL frequency band and the first DL frequency band.

In at least one embodiment, the self-interference strength is the self-interference strength of the terminal device at the first transmit power. The first transmit power is the transmit power under which the terminal device sends the signal to the network device by using a first UL frequency band.

The communication unit 420 is further configured to receive second instruction information sent by the network device. The second instruction information is used for instructing the terminal device to measure and/or report the strength of the self-interference with the terminal device generated by the first UL frequency band and the first DL frequency band under the first transmit power.

In at least one embodiment, the communication unit 420 is further configured to: in a first time period, send a UL signal to the network device by using a first UL frequency and receive a signal on a first DL frequency.

The processing unit 410 is further configured to determine strength of the signal received by the communication unit 420 as the self-interference strength.

In at least one embodiment, the communication unit 420 is further configured to receive third instruction information sent by the network device. The third instruction information is used for instructing the terminal device to measure the strength of the self-interference with the terminal device generated by the first UL frequency band and the first DL frequency band in the first time period.

In at least one embodiment, the first message carries a first CQI, and the first CQI is used for indicating the strength of the self-interference with the terminal device generated by the first DL frequency band and the first UL frequency band.

In at least one embodiment, the processing unit 410 is further configured to: determine a second CQI according to a reference signal sent to the terminal device by the network device using the first DL frequency; and determine the first CQI according to the second CQI and the determined self-interference strength.

In at least one embodiment, the first message contains a first bit.

When the first bit is a first value, a CQI in the first message is the first CQI.

When the first bit is a second value, the CQI in the first message is the second CQI.

In at least one embodiment, the first UL frequency band includes multiple frequency bands; and/or, the first DL frequency band includes multiple frequency bands.

It is to be understood that the terminal device 400 may correspond to the terminal device in the method embodiment, may implement corresponding operations implemented by the terminal device in the method embodiment, and will not be elaborated herein for simplicity.

FIG. 5 is a schematic block diagram of a network device 500 according to an embodiment of the disclosure. As illustrated in FIG. 5, the network device 500 includes a communication unit 510 and a processing unit 520.

The communication unit 510 is configured to receive a first message sent by a terminal device. The first message is used for instructing strength of self-interference with the terminal device generated by a first UL frequency band and first DL frequency band during communication between the terminal device with a network device.

The processing unit 520 is configured to schedule the terminal device according to the self-interference strength.

In at least one embodiment, the first message includes the following information: information of the first UL frequency band; information of the first DL frequency band; and information indicating the self-interference strength.

In at least one embodiment, the first message is further configured to indicate: a type of self-interference of the terminal device in the first UL frequency band and the first DL frequency band; and/or, a first transmit power. The first transmit power is a transmit power under which the terminal device sends a signal to the network device by use of the first UL frequency band.

In at least one embodiment, the communication unit 510 is further configured to: send instruction information to the terminal device. The instruction information is used for instructing the terminal device to measure and/or report the strength of the self-interference with the terminal device generated by the first UL frequency band and the first DL frequency band.

In at least one embodiment, the instruction information is further configured to indicate at least one of: transmit power under which the terminal device sends a signal to the network device by using a first UL frequency during measurement of the self-interference strength; and/or, a time period for measurement of the self-interference strength.

In at least one embodiment, the communication unit 510 is further configured to: in the time period for measuring the self-interference strength indicated by the instruction information, send DL signal to the terminal device without using the first DL frequency band.

In at least one embodiment, the first message carries a first CQI, and the first CQI is used for indicating the strength of the self-interference with the terminal device generated by the first DL frequency band and the first UL frequency band.

In at least one embodiment, the first message contains a first bit.

When the first bit is a first value, it is indicated that a CQI in the first message is the first CQI.

When the first bit is a second value, it is indicated that the CQI in the first message is a second CQI. The second CQI being is not used for indicating the strength of the self-interference with the terminal device generated by the first DL frequency band and the first UL frequency band.

In at least one embodiment, the first UL frequency band includes multiple frequency bands; and/or, the first DL frequency band includes multiple frequency bands.

It is to be understood that the network device 500 may correspond to the network device in the method embodiment, may implement corresponding operations implemented by the network device in the method embodiment and, will not be elaborated herein for simplicity.

FIG. 6 is a schematic structure diagram of a system chip 600 according to an embodiment of the disclosure. The system chip 600 of FIG. 6 includes an input interface 601, an output interface 602, a processor 603 and a memory 604 which may be connected through an internal communication connecting line. The processor 603 is configured to execute a code stored in the memory 604.

In at least one embodiment, when the code is executed, the processor 603 implements the method executed by the network device in the method embodiment, which will not be elaborated herein for explicitly.

In at least one embodiment, when the code is executed, the processor 603 implements the method executed by the terminal device in the method embodiment, which will not be elaborated herein for explicitly.

Figure 7:
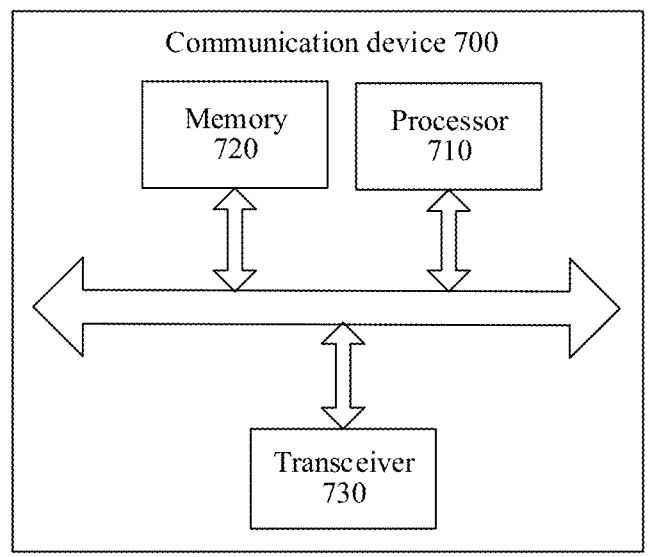
FIG. 7 is a schematic block diagram of a communication device according to an embodiment of the disclosure.

FIG. 7 is a schematic block diagram of a communication device 700 according to an embodiment of the disclosure. As illustrated in FIG. 7, the communication device 700 includes a processor 710 and a memory 720. The memory 720 may store a program code, and the processor 710 may execute the program code stored in the memory 720.

In at least one embodiment, as illustrated in FIG. 7, the communication device 700 may include a transceiver 730, and the processor 710 may control the transceiver 730 to perform external communication.

In at least one embodiment, the processor 710 may call the program code stored in the memory 720 to execute corresponding operations of the network device in the method embodiment, which will not be elaborated herein for explicitly.

In at least one embodiment, the processor 710 may call the program code stored in the memory 720 to execute corresponding operations of the terminal device in the method embodiment, which will not be elaborated herein for explicitly.

It is to be understood that the processor in the embodiment of the application may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the application may be implemented or executed. The universal processor may be a microprocessor or the processor may also be any conventional processor and the like. The steps of the method disclosed in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a read-only memory, a programmable read-only memory or electrically erasable programmable read-only memory and a register. The storage medium is located in a memory, and the processor reads information in the memory, and completes the steps of the methods in combination with hardware.

It can be understood that the memory in the embodiment of the application may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims

What is claimed is:

1. A wireless communication method, comprising:
   determining, by a terminal device, strength of self-interference with the terminal device generated by a first Uplink (UL) frequency band and first Downlink (DL) frequency band during communication with a network device; and
   sending, by the terminal device, a first message to the network device, the first message being used to indicate the strength of the self-interference with the terminal device generated by the first UL frequency band and the first DL frequency band,
   wherein the strength of the self-interference is self-interference strength at the terminal device under a first transmit power, the first transmit power being a transmit power under which the terminal device sends a signal to the network device by using the first UL frequency band,
   wherein determining, by the terminal device, the strength of the self-interference with the terminal device generated by the first UL frequency band and the first DL frequency band during communication with the network device comprises:
      determining, by the terminal device through measurement, the strength of the self-interference with the terminal device generated by the first UL frequency band and the first DL frequency band, and
   the method further comprises:
      receiving, by the terminal device, second instruction information sent by the network device, the second instruction information being used to instruct the terminal device to measure and/or report the strength of the self-interference with the terminal device generated by the first UL frequency band and the first DL frequency band at the first transmit power.

2. The method of claim 1, wherein the first message comprises the following information:
   information of the first UL frequency band;
   information of the first DL frequency band; and
   information indicating the strength of the self-interference.

3. The method of claim 1, wherein the first message is further used to indicate a type of self-interference with the terminal device generated by the first UL frequency band and the first DL frequency band.

4. The method of claim 1, wherein determining, by the terminal device through measurement, the strength of the self-interference with the terminal device generated by the first UL frequency band and the first DL frequency band comprises:
   in a first time period, sending, by the terminal device, a UL signal to the network device by using a first UL frequency, and receiving a signal on a first DL frequency; and
   determining, by the terminal device, strength of the received signal as the self-interference strength.

5. The method of claim 4, further comprising:
   receiving, by the terminal device, third instruction information sent by the network device, the third instruction information being used to instruct the terminal device to measure the strength of self-interference with the terminal device generated by the first UL frequency band and the first DL frequency band in the first time period.

6. The method of claim 1, wherein the first message carries a first Channel Quality Indicator (CQI), the first CQI being used to indicate the strength of the self-interference with the terminal device generated by the first UL frequency band and the first DL frequency band.

7. A wireless communication method, comprising:
receiving, by a network device, a first message sent by a terminal device, the first message being used to indicate strength of self-interference with the terminal device generated by a first Uplink (UL) frequency band and first Downlink (DL) frequency band during communication with the terminal device; and
scheduling, by the network device, the terminal device according to the strength of the self-interference,
wherein the first message is further used to indicate a first transmit power, the first transmit power being a transmit power under which the terminal device sends a signal to the network device by using a first UL frequency band, and
wherein before receiving, by the network device, the first message sent by a terminal device, the method further comprises:
sending, by the network device, instruction information to the terminal device, the instruction information being used to indicate: the terminal device to measure and/or report the strength of the self-interference with the terminal device generated by the first UL frequency band and the first DL frequency band at the first transmit power when measuring the self-interference strength.

8. The method of claim 7, wherein the first message comprises the following information:
information of the first UL frequency band;
information of the first DL frequency band; and
information indicating the strength of the self-interference.

9. The method of claim 7, wherein the first message is further used to indicate at least one of the following:
a type of self-interference with the terminal device generated by the first UL frequency band and the first DL frequency band.

10. The method of claim 7, wherein the instruction information is further used to indicate at least one of the following:
a time period for measuring the self-interference strength.

11. The method of claim 10, further comprising:
sending, by the network device, a DL signal to the terminal device without using the first DL frequency band in the time period for measuring the self-interference strength indicated by the instruction information.

12. A terminal device, comprising a processor and a transceiver, wherein
the processor is configured to determine strength of self-interference with the terminal device generated by a first Uplink (UL) frequency band and first Downlink (DL) frequency band during communication with a network device; and
the transceiver is configured to send a first message to the network device, the first message being used to indicate the strength of the self-interference with the terminal device generated by the first UL frequency band and the first DL frequency band,
wherein the strength of the self-interference is self-interference strength at the terminal device under a first transmit power, the first transmit power being a transmit power under which the terminal device sends a signal to the network device by using the first UL frequency band;
wherein the processor is further configured to:
determine, through measurement, the strength of the self-interference with the terminal device generated by the first UL frequency band and the first DL frequency band, and
the transceiver is further configured to:
receive second instruction information from the network device, the second instruction information being used to instruct the terminal device to measure and/or report the strength of the self-interference with the terminal device generated by the first UL frequency band and the first DL frequency band at the first transmit power.

13. The terminal device of claim 12, wherein the transceiver is further configured to:
receive first instruction information sent by the network device, the first instruction information being used to instruct the terminal device to measure and/or report the strength of the self-interference with the terminal device generated by the first UL frequency band and the first DL frequency band.

14. The terminal device of claim 12, wherein the transceiver is further configured to:
in a first time period, send a UL signal to the network device by using a first UL frequency and receive a signal on a first DL frequency; and
the processor is further configured to determine strength of the signal received by the transceiver as the strength of self-interference.

15. The terminal device of claim 14, wherein the transceiver is further configured to:
receive third instruction information sent by the network device, the third instruction information being used to indicate the terminal device to measure the strength of the self-interference with the terminal device generated by the first UL frequency band and the first DL frequency band in the first time period.

16. The terminal device of claim 12, wherein the first message carries a first Channel Quality Indicator (CQI), the first CQI being used to indicate the strength of the self-interference with the terminal device generated by the first UL frequency band and the first DL frequency band.

17. The terminal device of claim 12, wherein the first message comprises the following information:
information of the first UL frequency band;
information of the first DL frequency band; and
information indicating the strength of the self-interference.

18. The terminal device of claim 12, wherein the first message is further used to indicate a type of self-interference with the terminal device generated by the first UL frequency band and the first DL frequency band.

* * * * *